United States Patent [19]

Byon

[11] Patent Number: 5,662,355
[45] Date of Patent: Sep. 2, 1997

[54] AIR BAG SYSTEM FOR A MOTOR VEHICLE

[75] Inventor: Sung-Kwang Byon, Seoul, Rep. of Korea

[73] Assignee: Daewoo Electronics Co, Ltd., Seoul, Rep. of Korea

[21] Appl. No.: 580,848

[22] Filed: Dec. 29, 1995

[30] Foreign Application Priority Data

Apr. 25, 1995 [KR] Rep. of Korea .................. 95-9720

[51] Int. Cl.$^6$ .................................................. B60R 21/20
[52] U.S. Cl. ..................... 280/743.1; 280/731; 280/732
[58] Field of Search ............................. 280/743.1, 731, 280/732

[56] References Cited

U.S. PATENT DOCUMENTS 3,799,576  3/1974  Fiala ..................................... 280/743.1

Primary Examiner—Kenneth R. Rice
Attorney, Agent, or Firm—Beveridge, DeGrandi, Weilacher & Young LLP

[57] ABSTRACT

An air bag system in which a small quantity of gas is necessary for quickly unfolding the air bag, is disclosed. The air bag system has a housing having a cover at the upper portion thereof and an inflator for generating inert gas. The inflator being provided at the bottom portion of said housing and is filled therein with an explosive material for generating the inert gas by igniting the explosive material when a collision sensing signal which is generated at the collision of the motor vehicle. An inflatable air bag is folded in said housing and has a front portion which contacts with a human body when unfolded, an inlet portion for introducing the inert gas into said inflatable air bag, a middle portion between the front portion and the inlet portion. The front portion has a flexible foam coated on an outer surface of the front portion. Thus, the air bag can be fully unfolded by using only a small quantity of the gas, thereby reducing the amount of the igniting agent and the gas generation material. An unfolding force can be obtained regardless of the air bag sizes and the amount of the expanding gas having a hot temperature and high pressure. The danger of being burned and the secondary shock due to the unfolding of the air bag may be removed.

19 Claims, 6 Drawing Sheets

AIR BAG SYSTEM FOR A MOTOR VEHICLE

BACKGROUND OF THE INVENTION

1. Field of the Invention

The present invention relates to an air bag system for a motor vehicle, and more particularly to an air bag system for a motor vehicle having an air bag module capable of rapidly inflating by a small quantity of inflating gas for an air bag.

2. Description of the Prior Art

A variety of air bag apparatuses for motor vehicles have been proposed hitherto. A conventional air bag apparatus for a motor vehicle generally includes an inflatable air bag and a collision sensor for sensing the collision of the motor vehicle to generate a collision sensing signal. Also, the conventional air bag apparatus includes an electronic control unit (hereinafter referred to as "ECU") for receiving the collision sensing signal from the collision sensor to control the operation of the air bag, and an inflator for injecting gas or air into the inflatable air bag in accordance with an air bag expansion triggering signal from the ECU to expand the air bag.

FIG. 4 illustrates a schematic view of the constitution of the conventional air bag apparatus. As shown in FIG. 4, if a shock is applied to a car body by the collision with another vehicle or object while the vehicle is moving along a road, the vehicle's collision is monitored by a collision sensor 10 mounted to the forefront of the vehicle. Collision sensor 10 generates the collision sensing signal and supplies it to an ECU 20 when the shock against the car body exceeds a preset shock value required for inflating an air bag 40. ECU 20 determines whether or not the collision sensing signal is received from collision sensor 10 to provide the air bag expansion triggering signal to an inflator 30. Once the air bag expansion triggering signal is provided, inflator 30 injects an inert gas such as nitrogen $N_2$ or argon Ar, or air into inflatable air bag 40 to instantaneously inflate air bag 40. Consequently, the passenger in the vehicle can be protected from colliding with a structural part of the vehicle by the inflated air bag 40.

In the conventional air bag apparatus operated as above, since an inflation gas of high temperature and high pressure produced by the explosive combustion of a pyrotechnic material and a gas generating material being an ignitable material included in the inflator is instantaneously supplied into the folded air bag having a volume of about 60 to 120 L to inflate the air bag, large quantities of pyrotechnic material and gas generating material are required for a perfect expansion of the air bag. Moreover, at the moment of air bag 40 expands, the driver or the passenger who contacts air bag 40 might get burnt by the inflation gas of high temperature and high pressure and might get secondary shock by the high pressure of air bag 40. Besides, after expanding the air bag, the inflation force of the air bag is degraded resulting from the decreased pressure of the inflation gas.

U.S. Pat. No. 5,186,492 issued to Eric W. Wright on Feb. 16, 1993 discloses an air bag module capable of being employed in an air bag apparatus for a motor vehicle. The disclosed air bag module comprises a reaction device, a container including a cover fixed to the reaction device, an air bag disposed substantially in the container and an inflator coupled to the container. In this air bag module, the air bag can be efficiently fixed to the container and can be disposed in the container using relatively few parts. Besides, the air bag module can be mounted advantageously in a limited space available in a steering wheel. However, although the assembly thereof is simple and the establishment thereof is advantageous, since the air bag module described in the Eric W. Wright patent still employs the conventional air bag and inflator, the above-mentioned problems still remain.

Meantime, the air bag installed to a front passenger seat beside a driver's seat in the motor vehicle should have a capacity larger than the air bag implemented to the driver's seat by approximately 2.5 times since the physical features of the passenger occupying the front passenger seat vary more than the driver occupying the driver's seat. In other words, the passenger occupying the front passenger seat just beside the driver's seat differs from a child to an adult and probably has a relatively unstable posture as compared with the driver. Therefore, in order to safely protect the passenger on the front passenger seat from an accident, the air bag mounted to the passenger's compartment must have a capacity greater than that of the air bag mounted to the driver's compartment. As the result, the air bag having a capacity greater than that of the air bag for the driver's compartment has been typically mounted to the passenger's front compartment.

An inflator devised for generating gas of a great volume for supplying gas having a larger volume into the air bag of the relatively great capacity to obtain a desired inflating force has been employed.

U.S. Pat. No. 5,219,178 issued to Hirokazu Kobari et al. on Jun. 15, 1993 discloses an air bag inflation gas generator which includes a substantially circular cylinder formed with a gas exhaust in the middle portion thereof. Two combustion chambers formed by separating members are provided to both ends of the circular cylinder. In addition, a cylindrical end filter is installed coaxially with the circular cylinder within the center of the circular cylinder, middle filters are installed between the separating members and an end filter, and orifices directing the middle filters are formed. An object of the inflation gas generator constructed as above is for generating a combustion gas having a greater volume and for increasing the combustible surface area of gas generating materials to thereby adjust the expansion of the air bag in the optimum state.

The Hirokazu Kobari's generator can supply the combustion gas of the larger volume, but two combustion chambers and the plurality of filters are employed for generating the combustion gas of the larger volume. Consequently, the inflation gas generator is disadvantageous in that large quantities of pyrotechnic material and gas generating material are required, the construction is complicated and a high manufacturing cost is needed.

FIG. 5 illustrates an air bag module which has been employed in the conventional air bag apparatus. An air bag module 100 has a container 110, an air bag 40 disposed in container 110 and a cylindrical inflator 30 secured to container 110. Container 110 has a reaction device 120 and a cover 130 fastened to reaction device 120. Container 110 defines an internal cavity 112.

Air bag 40 generally having a volume of from 60 to 120 L is disposed substantially in internal cavity 112. A portion of air bag 40 is disposed between cover 130 and reaction device 120, and is secured to a retainer frame 48 located outside of container 110. The remaining portion of air bag 40 is disposed in internal cavity 112 of container 110.

Cover 130 is preferably made of a flexible plastic material. The inside of cover 130 has internal score lines 132 disposed in a predetermined configuration.

Inflator 30 is attached to container 110 after the container has been preassembled. Inflator 30 has a cylindrical outer housing 32. Cylindrical outer housing 32 has a plurality of gas dispensing nozzles 34. When a motor vehicle collides, gas dispensing nozzles 34 rapidly discharge inert gas such as nitrogen into a second internal cavity 114 in air bag 40 to expand air bag 40.

Generally, air bag 40 and inflator 30 are connected to reaction device 120. Reaction device 120 is connected to a structural part of a vehicle. Reaction device 120 includes a reaction plate 122 formed of sheet steel. Reaction plate 122 comprises a planar main body 124, a pair of spaced apart, arcuate bands 126, and a series of first flanges 128. A central opening 140 is formed in planar main body 124. Central opening 140 extends between arcuate bands 126. First flanges 128 are formed at the perimeter of planar main body 124, and extend substantially perpendicular to planar main body 124.

Four threaded shafts 142 (only two of them are shown) are used to couple air bag module 100 to the structural part of a vehicle. Threaded shafts 142 are integrally connected to and extend away from main body 124. First flange 128 extends rearward away from an external wall 116 of container 110.

Arcuate bands 126 form a cradle for receiving cylindrical inflator 30. When inflator 30 is properly aligned in the cradle formed by arcuate bands 126, a plurality of gas dispensing nozzles 34 formed cylindrical outer housing 32 of inflator 30 will be aligned with central opening 140 in main body 124 to direct gas discharged by inflator 30 through central opening 124 and into second internal cavity 114 of air bag 40. First flanges 128 positioned at the periphery of main body 124 is suitable to fix cover 130 to reaction plate 122.

Cover 130 is a cup-shaped member. Four second flanges 150 (only two of them are shown) are formed at the border of cover 130. Formed in second flanges 150 on cover 130 and first flanges 128 on reaction plate 122 are rivet holes 152 and 154, respectively. Rivet holes 152 and 154 are aligned with each other to enable rivets or other fasteners to be driven through the aligned holes to fasten cover 130 securely with reaction plate 122.

FIG. 6 illustrates air bag 40 in air bag module 100 illustrated in FIG. 5. Air bag 40 has a mouth 42. Mouth 42 defines an inlet opening through which gas is communicated with second internal cavity 114 in air bag 40. The air bag fabric is formed into a fabric tube 44 at mouth 42 of air bag 40. A retainer frame 48 comprises a continuous frame member 46 adapted to be disposed inside fabric tube 44.

The air bag fabric adjacent to fabric tube 44 is disposed between second flanges 150 on cover 130 and first flanges 128 on reaction plate 122, as illustrated in FIG. 5. The air bag fabric is fixed between first flanges 122 and second flanges 150 by fastening second flanges 150 on cover 130 and second flanges on reaction plate 122 together.

With the conventional air bag module 100 constituted as described above, since air bag 40 expands by rapidly injecting inflation gas of high temperature and high pressure into air bag 40 having a volume of about from 60 to 120 L, a large amount of pyrotechnic material and gas generating material is needed in order to accomplish a complete expansion of air bag 40. In addition, after the complete expansion of air bag 40, the inflation gas of high temperature and high pressure may burn a driver or a passenger who contacts air bag 40, and, further, the high pressure may apply a secondary shock to the driver or passenger. Besides, after the complete expansion of air bag 40, the expanding power of air bag 40 can be rapidly lowered due to the reduced pressure of the inflation gas.

SUMMARY OF THE INVENTION

The present invention is contrived to solve the foregoing problems. It is an object of the present invention to provide an air bag system having an improved air bag module, in which a small quantity of the gas is necessary for quickly unfolding the air bag.

In order to achieve the above object, the present invention provides an air bag system for a motor vehicle, the air bag system comprising:

a housing having a cover at an upper portion thereof, the cover being operable at a collision of the motor vehicle;

an inflator for generating an inert gas, the inflator being provided at a bottom potion of the housing and being filled therein with an explosive material for generating the inert gas by igniting the explosive material when a collision sensing signal which is generated at the collision of the motor vehicle;

inflatable air bag for being unfolded by introducing the inert gas therein, the inflatable air bag being comprised of a continuous fabric material, the inflatable air bag being folded in the housing and having a front portion which contacts with a human body when unfolded, an inlet portion for introducing the inert gas into the inflatable air bag, a middle portion between the front portion and the inlet portion, the front portion having a flexible foam coated on an outer surface of the front portion, the inlet portion surrounding the inflator;

a supporting member for supplying a pressure to the inflatable air bag together with the cover so as to reduce a volume of the inflatable air bag, thereby installing enabling the inflatable air bag to be installed in the housing, the supporting member being provided between the cover and the inflator and being fixed to an inner bottom portion of the housing.

The supporting member is comprised of a synthetic resin. Preferably, the synthetic resin is a nylon. The flexible foam has a density of 8–12K g/l, a molecular weight of 1000–6500 g/mole, and a thickness of 10–20 cm under an atmospheric pressure. The flexible foam is in a hardened form. Preferably, the hardened foam is comprised of polyurethane form. Preferably, the hardened foam is comprised of a styrene foam. The flexible foam is in a microcellur foam.

The flexible foam has a density of $10^{12}$–$10^{18}$ g/cc. A volume of the flexible foam under an atmospheric pressure is one-sixth to a half of a total volume of the inflatable air bag when the inflatable air bag is unfolded. Preferably, a volume of the flexible foam under an atmospheric pressure is one-third of a total volume of the inflatable air bag when the inflatable air bag is unfolded.

As described above, in the air bag system according to the present invention, a flexible foam is provided at the outer surface of the air bag and a supporting member is formed between the cover and the inflator. Thus, the air bag can be fully unfolded by using only a small quantity of the gas, thereby reducing the amount of the igniting agent and the gas generation material. Further, since variable flexible foams that have various sizes can be used depending upon the air bag sizes, an unfolding force can be obtained regardless of the air bag sizes and the amount of the expanding gas having a hot temperature and a high pressure. Therefore, the danger of being burned and secondary shock due to the unfolding of the air bag may be removed.

BRIEF DESCRIPTION OF THE DRAWINGS

The above objects and other advantages of the present invention will become more apparent by describing in detail preferred embodiments thereof with reference to the attached drawings in which.

DESCRIPTION OF THE PREFERRED EMBODIMENT

Hereinbelow, one embodiment of the present invention will be described with reference to the accompanying drawings in detail.

Figure 1:
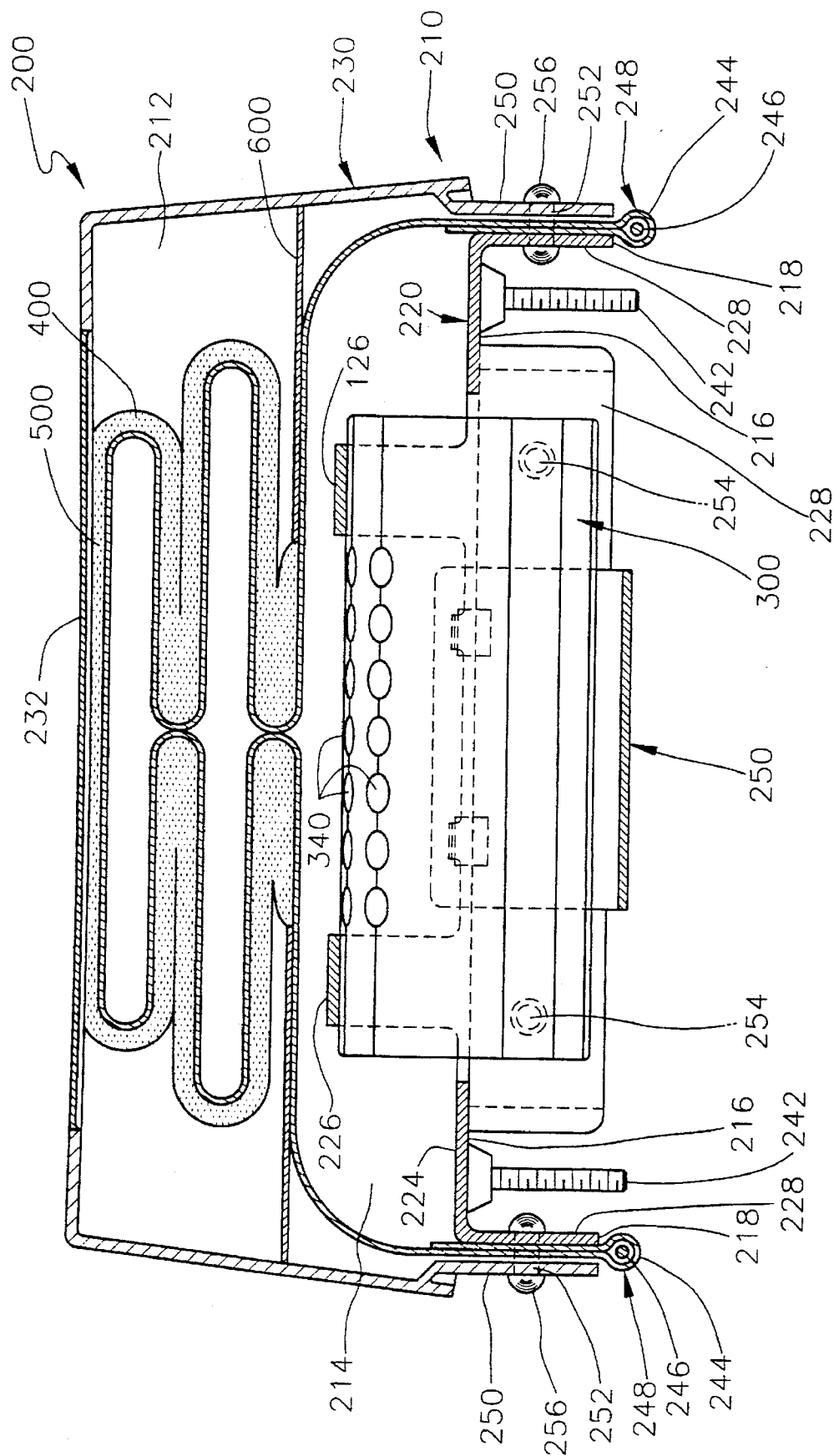
FIG. 1 is a view of showing an air bag module 200 according to the preferred embodiment of the present invention.

FIG. 1 is a view for showing an air bag module 200 according to the preferred embodiment of the present invention. Air bag module 200 has a container 210, a folded air bag 400 arranged in the container 210, and a cylindrical inflator 300 fixed to container 210. Container 210 is assembled from the outside of automotive vehicles and located in vehicles as whole unit. Container 210 is formed as a subassembly which is separated from the inflator 300 and can be conveyed and stored separately. Container 210 is combined with inflator 300 at the final assembly stage of air bag module 200. Container 210 has a reaction device 220 and a cover 230 fixed to reaction device 220. Container 210 restricts a first internal cavity 212 where an inflatable folded air bag 400 is located.

In general, air bag 400 is a continuous fabric member which is comprised of a tough and durable fabric material such as nylon. Air bag 400 has a front portion which contacts with a human body when it is unfolded, an inlet portion for introducing the inert gas into air bag 400 which surrounds the inflator, a middle portion between the front portion and the inlet portion. The outer surface of the front portion of air bag 400 is covered with a flexible foam 500. Flexible foam 500 has a density of 8-12K g/l , a molecular weight of 1000-6500 g/mol, and a thickness of about 10-20 cm at an atmospheric pressure. Flexible foam 500 has a volume of about 1/6-1/2 of the total volume when air bag 400 is unfolded completely at the atmospheric pressure. Preferably, flexible foam 500 has the volume of about 1/3 of the total volume. Flexible foam 500 contacts with the human body when air bag 400 is expanded.

Preferably, flexible foam 500 is comprised of a hardened foam such as polyurethane foam or styrene foam in view of economy. Flexible foam 500 is also comprised of a microcellular foam having a density of $10^{12}$-$10^{18}$ g/cc.

Since flexible foam 500 has a large volume, air bag 400 is installed in container 212 by applying pressure. To achieve this, a supporting member 600 is provided at the inner lower portion of container 212. Supporting member 600 is comprised of a synthetic resin of a nylon type.

A portion (the inlet portion) of air bag 400 is arranged between supporting member 600 and reaction device 220, and is fixed at a retainer frame 248 located outside container 210. Also, the remaining portion of air bag 400 is located in the first internal cavity 212 of container 210. Air bag 400 is mounted at a folded state to have a predetermined space in first internal cavity 212.

Cover 230 is comprised of a hardened flexible plastic material, such as ployethlene which is usually used for making the dashboard of a vehicle. An internal score line 232 having a predetermined shape is formed inside cover 230. Internal score line 232 is formed at the predetermined positions of cover 230 so that cover 230 may be ruptured while air bag 400 is expanded.

After container 210 having the folded air bag 400 in the folded state therein is firstly assembled, inflator 300 is attached to container 210. That is, inflator 300 is attached to container 210 which has been assembled, thereby completing air bag module 200. Inflator 300 has a cylindrical outer housing 320, and housing 320 has a plurality of gas distribution nozzles 340. When the car has a collision, gas distribution nozzles 340 abruptly discharge a non-poisonous inert gas such as nitrogen into a second internal cavity 214 of air bag 400. Then, as the gas fills up, air bag 400 penetrates the fragile portion around internal score line 232 of cover 230 so that air bag 400 is expanded toward the front of passenger in vehicle.

Figure 2:
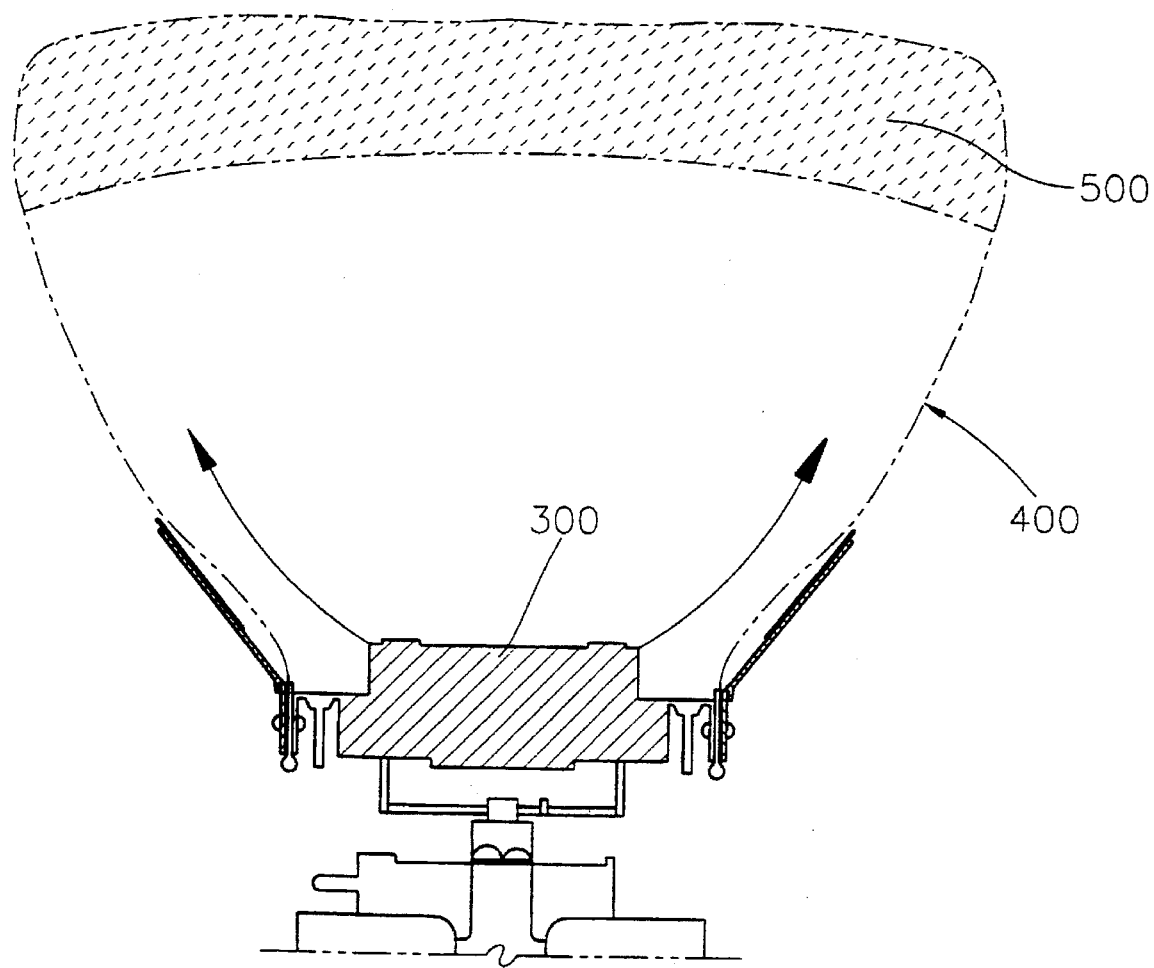
FIG. 2 is a view for showing an unfolded state of an air bag as shown in FIG. 1.

FIG. 2 is a view for showing a completely unfolded state of air bag 400 according to the present invention. As described above, flexible foam 500 having a volume of about 1/2-1/6 of the completely expanded air bag 400, is located on the outer surface of the front portion of air bag 400. Therefore, even though a small amount of the air bag inflation gas is injected by inflator 300, air bag 400 can be fully expanded rapidly. Also, the amount of inflation gas of a high temperature and a high pressure which is required to expand air bag 400, is reduced so that the danger of a burn or an injury by the second shock may be avoided.

Referring to FIG. 1, reaction device 220 spouting the gas with a high temperature and a high pressure to expand air bag 400, has a reaction plate 222 which is comprised of sheet steel. Reaction plate 222 has a planar main body 224, a pair of spaced apart arcuate band 226 integrally foamed with planar main body 224, and a series of first flanges 228. A central opening 240 is formed at planar main body 224. Central opening 240 is prolonged between arcuate bands 226. First flanges 228 are formed on the perimeter of planar main body 224, and are vertically prolonged from planar main body 224. To prevent the formation of a sharp corner which bursts the fabric of air bag, the connection portion between planar main body 224 and first flanges 228, and an end portion 218 of first flanges 228 are formed to have a curved shape.

Four threaded shafts 242 are used for the connection between air bag module 200 and a structural part of the vehicle. Threaded shafts 242 are integrally connected with main body 224, and then they are prolonged outwardly from main body 224. In case that reaction plate 222 is integrated in container 210, the surface of main body 224 forms an outside wall 216 of container 210. First flanges 228 are prolonged outward from outside wall 216 of container 210.

Arcuate bands 226 form the cradle for receiving cylindrical inflator 300. In the case that inflator 300 is suitably arranged in the cradle formed by arcuate bands 226, gas distribution nozzles 340 formed at the cylindrical outer housing 320 of inflator 300, are arranged with central opening 240 of main body 224 so that the discharged gas by inflator 300 can be injected into second internal cavity 214 of air bag 400 through central opening 240. First flanges 228 located on the perimeter of main body 224 are suitable to fix the cover 230 on reaction plate 222. Also, first flanges 228 form a reaction structure to maintain the state that air bag 400 is fixed to reaction plate 222 when air bag 400 is expanded.

Cover 230 is a member having a cup shape. Four second flanges 250 are formed on the perimeter of cover 230. Second flanges 250 are integrally formed with the boundary of cover 230. Second flanges 250 have a size such that second flanges can be accurately fixed from the outside perimeter of reaction plate 222 to around first flanges 228. Rivet holes 252 and 254 are respectively formed at second flanges 250 on cover 230 and first flanges 228 on reaction plate 222. Rivet holes 252 and 254 are arranged to fix cover 230 on reaction plate 222 so that rivets 256 or other fixing element may pass therethrough.

Figure 3:
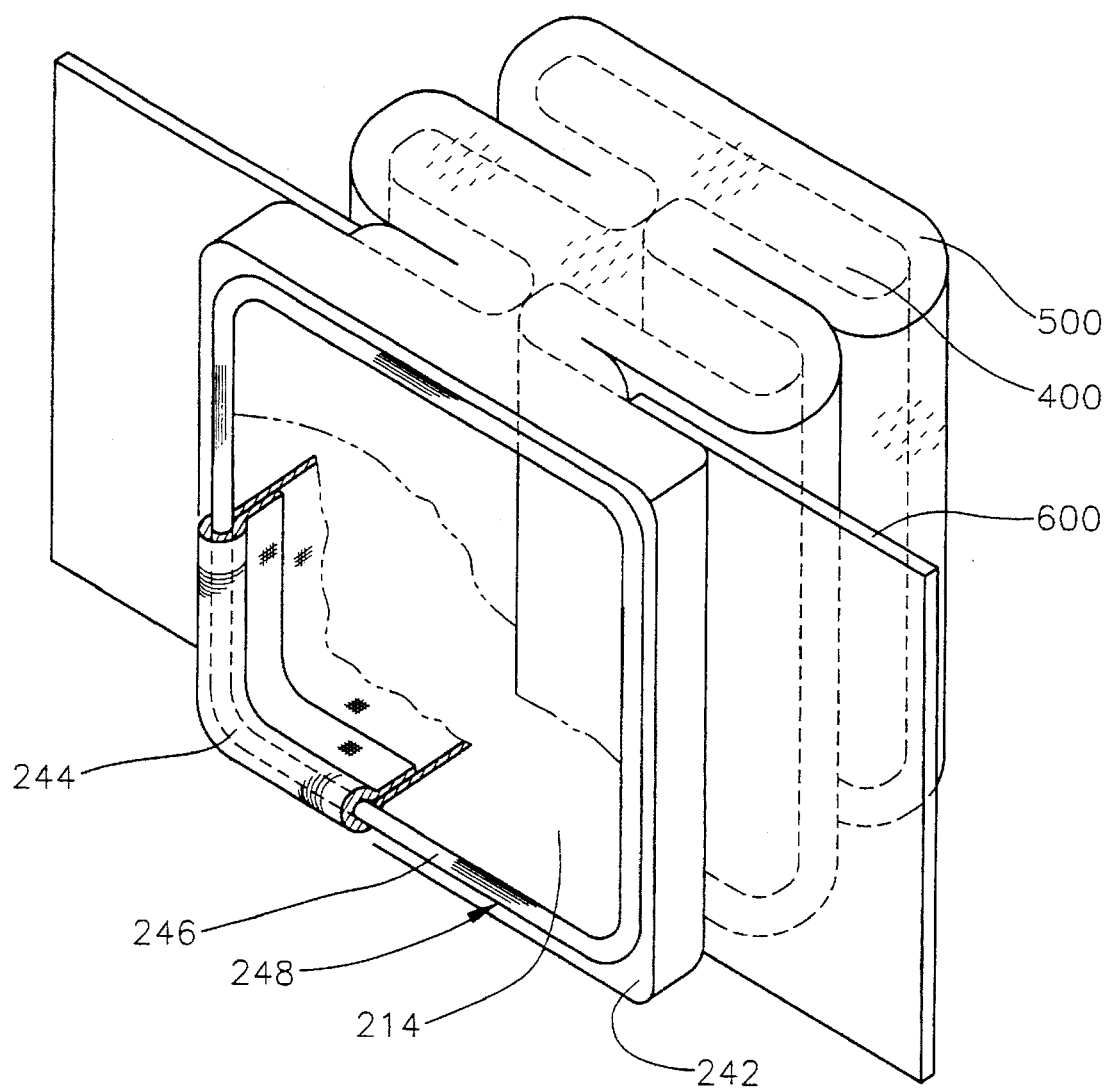
FIG. 3 is a view for showing an air bag of the air bag module as shown in FIG. 1.
Figure 4:
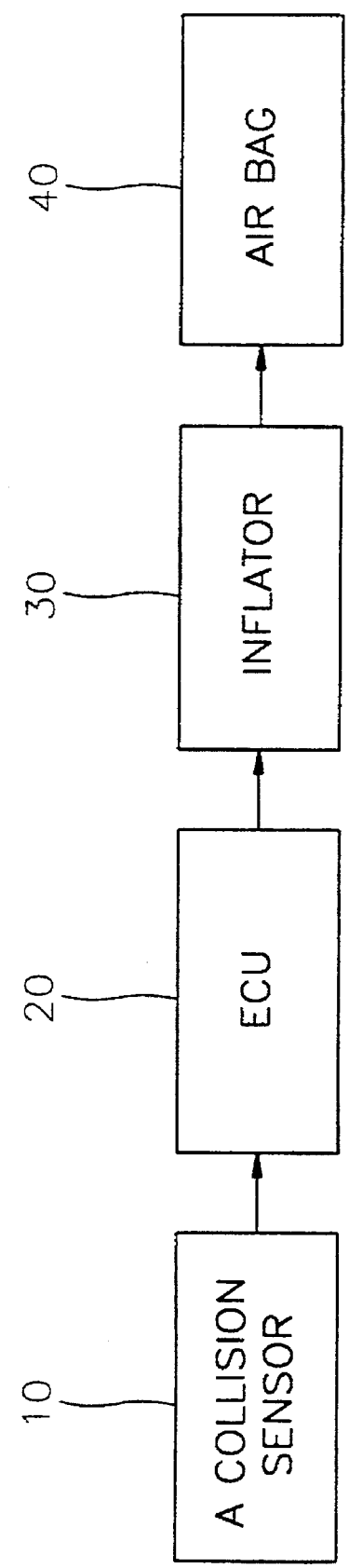
FIG. 4 illustrates a schematic view of the constitution of the conventional air bag apparatus.
Figure 5:
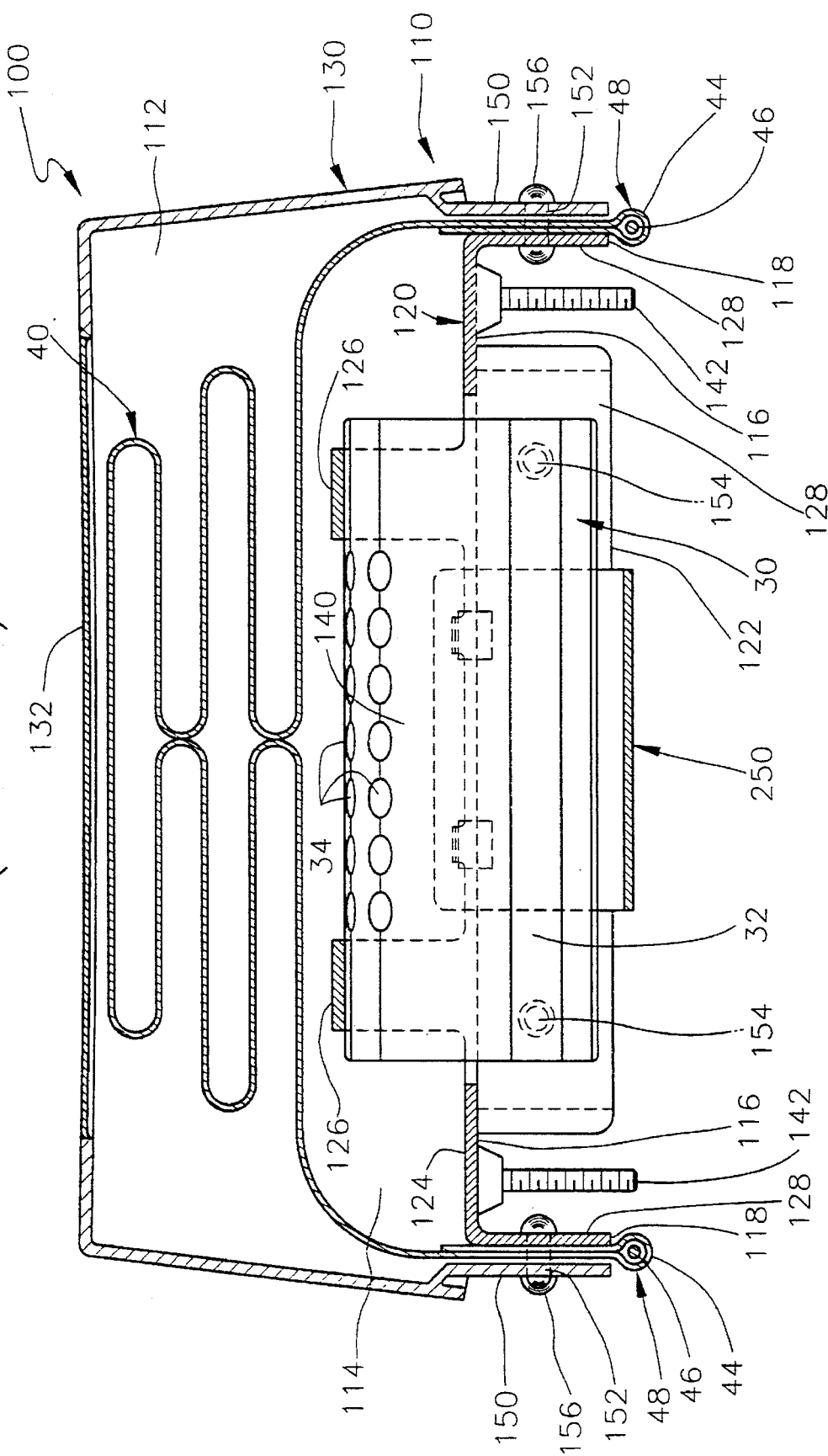
FIG. 5 illustrates an air bag module which has been employed in the conventional air bag apparatus.
Figure 6:
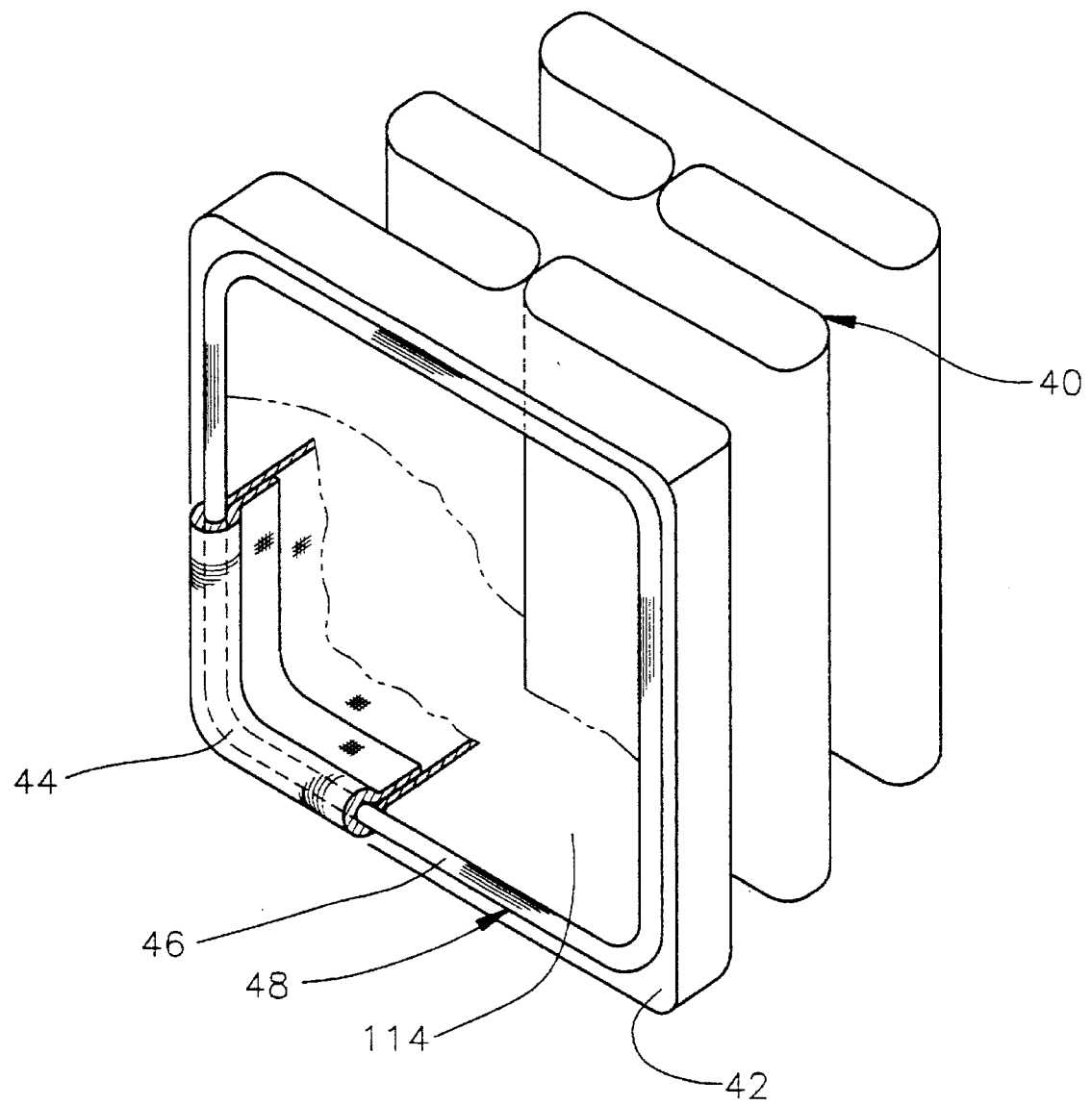
FIG. 6 illustrates an air bag in the air bag module illustrated in FIG. 5.

Referring to FIG. 3, air bag 400 has a mouth 242. Mouth 242 limits an inlet opening connected with the second internal cavity 214 of air bag 400. The fabric of air bag 400 is formed as a loop to have double layers of fabric material in mouth 242 of air bag 400, as a result a fabric tube 244 is formed. Retainer frame 248 includes a continuous frame member 246 which is suitable to be arranged into fabric tube 244. The continuous frame member 246 is manufactured with metal, nylon or other similar materials.

Fabric tube 244 can be formed around the continuous frame member 246 and the double layers of air bag fabric which are formed with fabric tube 244. The air bag fabric of double layers closed by fabric tube 244 is arranged between the second flanges 250 on cover 230 and the first flanges 228 on reaction plate 222. The air bag fabric is fixed together second flanges 250 on cover 230 and first flanges 222 on reaction plate 222, so that it is fixed at the middle of first flanges and second flanges.

As described above, the air bag system of the present invention has the air bag with a flexible foam on the outer surface, and is provided with a supporting member between a inflator and a cover so that the air bag can be rapidly expanded with a small amount of the inflation gas. Further, the amount of ignition material and gas generating material may be reduced. Also, the flexible foams having different sizes are respectively applied according to the size of the air bags, therefore a constant expansion force cab be obtained regardless of the size of the air bag, the danger of a burn or second rebound may be removed by reducing the amount of the inflation gas of a high temperature and a high pressure.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An air bag system for a motor vehicle, said air bag system comprising:

a housing having a cover at an upper portion thereof, the cover being operable at a collision of the motor vehicle;

an inflator for generating an inert gas, said inflator being provided at a bottom potion of said housing and being filled therein with an explosive material for generating the inert gas by igniting the explosive material when a collision sensing signal which is generated at the collision of the motor vehicle;

an inflatable air bag for being unfolded by introducing the inert gas therein, said inflatable air bag being comprised of a continuous fabric material, said inflatable air bag being folded in said housing and having a front portion which contacts with a human body when unfolded, an inlet portion for introducing the inert gas into said inflatable air bag, a middle portion between the front portion and the inlet portion, the front portion having a flexible foam coated on an outer surface of the front portion, said inlet portion surrounding said inflator; and a supporting member for supplying a pressure to said inflatable air bag together with the cover so as to reduce a volume of said inflatable air bag, thereby enabling said inflatable air bag to be installed in said housing, said supporting member being provided between the cover and said inflator and being fixed to an inner bottom portion of said housing.

2. An air bag system for a motor vehicle as claimed in claim 1, wherein a volume of the flexible foam under an atmospheric pressure in one-third of a total volume of said inflatable air bag when said inflatable air bag is unfolded.

3. An air bag system for a motor vehicle as claimed in claim 1, wherein said supporting member is comprised of a synthetic resin.

4. An air bag system for a motor vehicle as claimed in claim 3, wherein the synthetic resin is a nylon.

5. An air bag system for a motor vehicle as claimed in claim 1, wherein the flexible foam has a density of 8–12K g/l, a molecular weight of 1000–6500 g/mole, and a thickness of 10–20 cm under an atmospheric pressure.

6. An air bag system for a motor vehicle as claimed in claim 1, wherein the flexible foam is in a hardened form.

7. An air bag system for a motor vehicle as claimed in claim 6, wherein the hardened foam is comprised of polyurethane form.

8. An air bag system for a motor vehicle as claimed in claim 6, wherein the harden foam is comprised of a styrene foam.

9. An air bag system for a motor vehicle as claimed in claim 1, wherein the flexible foam is in a microcellur foam.

10. An air bag system for a motor vehicle as claimed in claim 1, wherein the flexible foam has a density of $10^{12}$–$10^{18}$ g/cc.

11. An air bag system for a motor vehicle as claimed in claim 1, wherein a volume of the flexible foam under an atmospheric pressure is one-sixth to a half of a total volume of said inflatable air bag when said inflatable air bag is unfolded.

12. An air bag system for a motor vehicle, said air bag system comprising:

a housing having a cover at an upper portion thereof, the cover being operable at a collision of the motor vehicle;

an inflator for generating an inert gas, said inflator being provided at a bottom potion of said housing and being filled therein with an explosive material for generating the inert gas by igniting the explosive material when a collision sensing signal which is generated at the collision of the motor vehicle;

an inflatable air bag for being unfolded by introducing the inert gas therein, said inflatable air bag being comprised of a continuous fabric material, said inflatable air bag being folded in said housing and having a front portion which contacts with a human body when unfolded, an inlet portion for introducing the inert gas into said inflatable air bag, a middle portion between the front portion and the inlet portion, the front portion having a flexible foam coated on an outer surface of the front portion, said inlet portion surrounding said inflator; and a supporting member comprised of a nylon for supplying a pressure to said inflatable air bag together with the cover so as to reduce a volume of said inflatable air bag, thereby enabling said inflatable air bag to be installed in said housing, said supporting member being provided between the cover and said inflator and being fixed to an inner bottom portion of said housing.

13. An air bag system for a motor vehicle as claimed in claim 12, wherein the flexible foam is in a microcellur foam having a density of $10^{12}$–$10^{18}$ g/cc.

14. An air bag system for a motor vehicle as claimed in claim 12, wherein the flexible foam has a density of 8–12K g/l, a molecular weight of 1000–6500 g/mole, and a thickness of 10–20 cm under an atmospheric pressure.

15. An air bag system for a motor vehicle as claimed in claim 12, wherein the flexible foam is in a hardened form.

16. An air bag system for a motor vehicle as claimed in claim 15, wherein the hardened form is comprised of a polyurethane form.

17. An air bag system for a motor vehicle as claimed in claim 15, wherein the hardened form is comprised of a styrene foam.

18. An air bag system for a motor vehicle as claimed in claim 12, wherein a volume of the flexible foam under an atmospheric pressure is one-sixth to a half of a total volume of said inflatable air bag when said inflatable air bag is unfolded.

19. An air bag system for a motor vehicle as claimed in claim 18, wherein a volume of the flexible foam under an atmospheric pressure is one-third of a total volume of said inflatable air bag when said inflatable air bag is unfolded.

* * * * *